(12) United States Patent
Pain

(10) Patent No.: US 11,983,764 B2
(45) Date of Patent: May 14, 2024

(54) BICYCLE LOCKING ASSEMBLY

(71) Applicant: Regan Pain, Osoyoos (CA)

(72) Inventor: Regan Pain, Osoyoos (CA)

( * ) Notice: Subject to any disclaimer, the term of this patent is extended or adjusted under 35 U.S.C. 154(b) by 259 days.

(21) Appl. No.: 17/564,319

(22) Filed: Dec. 29, 2021

(65) Prior Publication Data

US 2023/0206315 A1    Jun. 29, 2023

(51) Int. Cl.
*B62H 3/00* (2006.01)
*G06Q 30/0645* (2023.01)
*G07B 15/04* (2006.01)
*G07C 1/30* (2006.01)
*G07F 17/00* (2006.01)

(52) U.S. Cl.
CPC ........... *G06Q 30/0645* (2013.01); *B62H 3/00* (2013.01); *G07B 15/04* (2013.01); *G07C 1/30* (2013.01); *G07F 17/0057* (2013.01); *B62H 2003/005* (2013.01)

(58) Field of Classification Search
CPC .... B62H 3/00; B62H 2003/005; B62H 5/005; E05B 71/00; G06Q 30/0645; G06Q 20/16; G06Q 20/34; G07B 15/04; G07C 1/30; G07F 17/0057; G07F 7/08; G07F 7/10; G07F 7/1008
USPC ............ 211/5, 17, 22; 370/432; 70/7.1, 233; 340/432, 542, 568.1; 705/307; 235/381, 235/382
See application file for complete search history.

(56) References Cited

U.S. PATENT DOCUMENTS

| | | | |
|---|---|---|---|
| 3,786,928 A * | 1/1974 | Johnson | E05B 71/00 D12/115 |
| 4,433,787 A * | 2/1984 | Cook | B62H 3/00 194/902 |
| 4,830,167 A * | 5/1989 | Lassche | G07F 17/244 70/225 |
| 5,917,407 A * | 6/1999 | Squire | G07F 17/0057 235/382 |
| 6,053,337 A * | 4/2000 | Venegas, Jr. | B62H 3/04 211/20 |
| 6,157,315 A * | 12/2000 | Kokubo | G07B 15/00 340/432 |
| D449,256 S | 10/2001 | Kopacz | |
| 7,571,628 B2 | 8/2009 | D'Anieri | |
| 8,508,333 B2 | 8/2013 | Kanof | |

(Continued)

FOREIGN PATENT DOCUMENTS

EP         3231694 A1 * 10/2017
WO    WO2009080566       7/2009

*Primary Examiner* — Jennifer E. Novosad

(57) ABSTRACT

A bicycle locking assembly includes a bicycle rack is secured to a support surface and a plurality of parking elements each is integrated into the bicycle rack to have a respective bicycle parked in the parking elements. A plurality of bicycle locks is each movably integrated into the bicycle rack for locking a respective bicycle to a respective parking element. A card reader is coupled to the bicycle rack for processing a payment to facilitate a user to lock their bicycle to the bicycle rack. A camera is integrated into the bicycle rack to record footage of the bicycle rack thereby monitoring bicycles that are locked to the bicycle rack. A light emitter is coupled to the bicycle rack to emit light outwardly from the bicycle rack for enhancing visibility of the bicycle rack at night.

13 Claims, 8 Drawing Sheets

(56) References Cited

U.S. PATENT DOCUMENTS

| | | | |
|---|---|---|---|
| 8,678,205 B2* | 3/2014 | Mercat | B62H 3/04 |
| | | | 211/5 |
| 9,381,964 B2* | 7/2016 | Haidak | B62H 5/20 |
| 9,567,025 B2 | 2/2017 | Strother | |
| 10,641,014 B2* | 5/2020 | Tepper | B62H 5/20 |
| 10,723,399 B2 | 7/2020 | Assenat | |
| 10,991,250 B1* | 4/2021 | Arnold | G06Q 10/02 |
| 11,225,297 B2* | 1/2022 | Sawhill | B62H 5/142 |
| 2010/0117863 A1* | 5/2010 | Dutt | G07F 17/244 |
| | | | 340/932.2 |
| 2010/0163503 A1* | 7/2010 | Kelly | B62H 3/00 |
| | | | 235/382 |
| 2010/0228405 A1* | 9/2010 | Morgal | B62H 3/00 |
| | | | 701/1 |
| 2015/0074004 A1* | 3/2015 | Song | G07C 9/00896 |
| | | | 705/307 |
| 2015/0360739 A1* | 12/2015 | Ashlag | B62H 3/02 |
| | | | 211/5 |
| 2020/0189683 A1* | 6/2020 | Chen | B60L 53/30 |
| 2023/0206315 A1* | 6/2023 | Pain | G06Q 30/0645 |
| | | | 705/307 |
| 2023/0278443 A1* | 9/2023 | Deppe | B60L 53/30 |
| | | | 320/109 |

\* cited by examiner

US 11,983,764 B2

BICYCLE LOCKING ASSEMBLY

BACKGROUND OF THE INVENTION

(1) Field of the Invention

The disclosure relates to locking devices and more particularly pertains to a new locking device for locking bicycles at a public location. The device includes a rack with a plurality of cable locks that can each be extended through a bicycle to lock the bicycle to the rack. The device includes a card reader for processing a payment for renting the cable lock for a selected duration of time. The device includes a transceiver that broadcasts a numeric code to a user's smart phone thereby facilitating the numeric code to be entered into a keypad for subsequently unlocking their bicycle.

(2) Description of Related Art Including Information Disclosed Under 37 CFR 1.97 and 1.98

The prior art relates to locking devices including an automated bicycle rack that includes a plurality of wheel brackets that engages a front wheel of a bicycle for locking the bicycle. The prior art discloses a vehicle locking device which includes a stanchion and at least one cable that can be routed through a vehicle for locking the vehicle to the stanchion. The prior art discloses a parking station that includes an interactive workstation and a plurality of remotely positioned parking posts for locking a bicycle. The prior art discloses a bicycle lock that includes a workstation, a rail upon which a front wheel of a bicycle can be positioned and a lock integrated into the rail for locking the front wheel.

BRIEF SUMMARY OF THE INVENTION

An embodiment of the disclosure meets the needs presented above by generally comprising a bicycle rack is secured to a support surface and a plurality of parking elements each is integrated into the bicycle rack to have a respective bicycle parked in the parking elements. A plurality of bicycle locks is each movably integrated into the bicycle rack for locking a respective bicycle to a respective parking element. A card reader is coupled to the bicycle rack for processing a payment to facilitate a user to lock their bicycle to the bicycle rack. A camera is integrated into the bicycle rack to record footage of the bicycle rack thereby monitoring bicycles that are locked to the bicycle rack. A light emitter is coupled to the bicycle rack to emit light outwardly from the bicycle rack for enhancing visibility of the bicycle rack at night.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
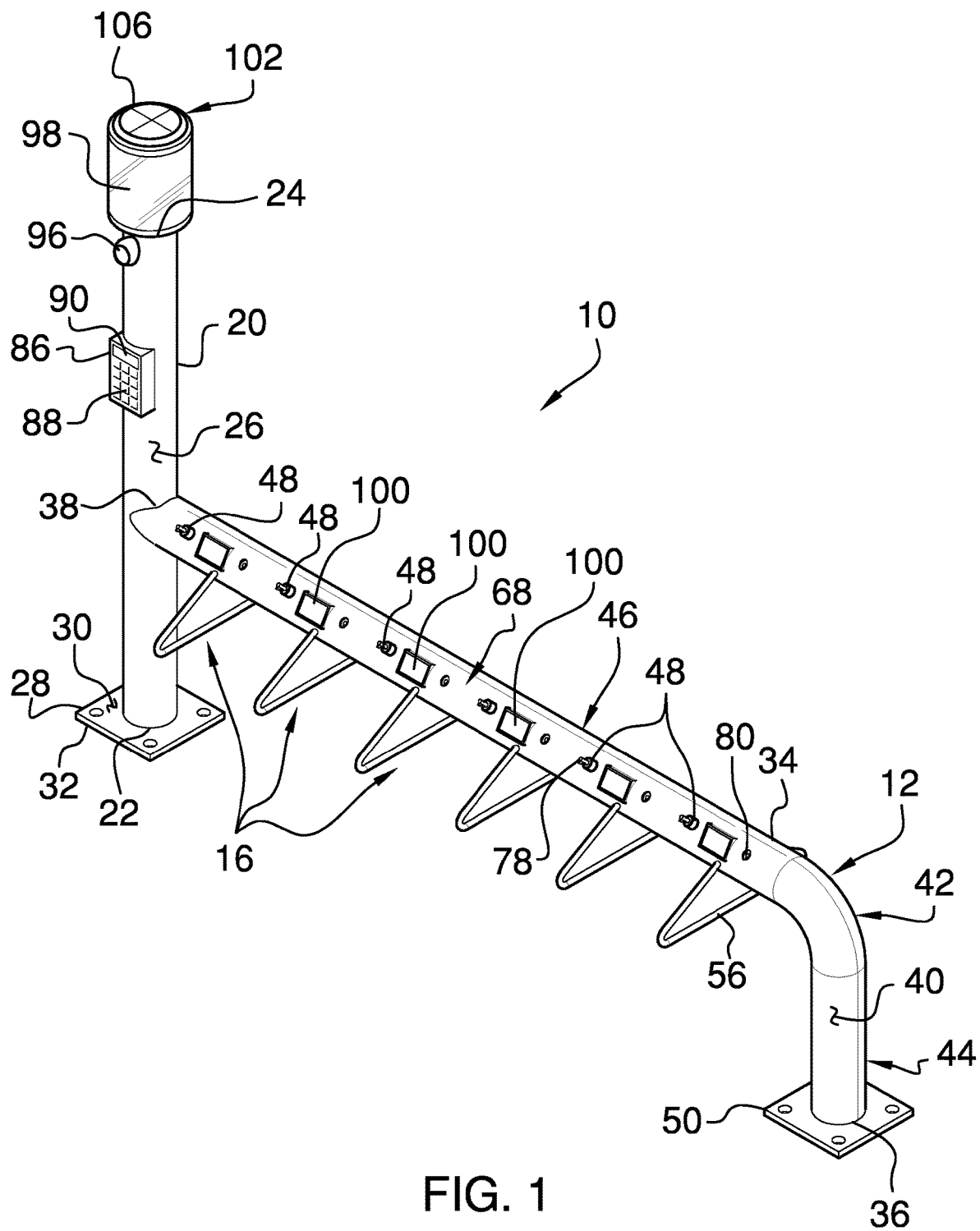
FIG. 1 is a front perspective view of a bicycle locking assembly according to an embodiment of the disclosure.
Figure 2:
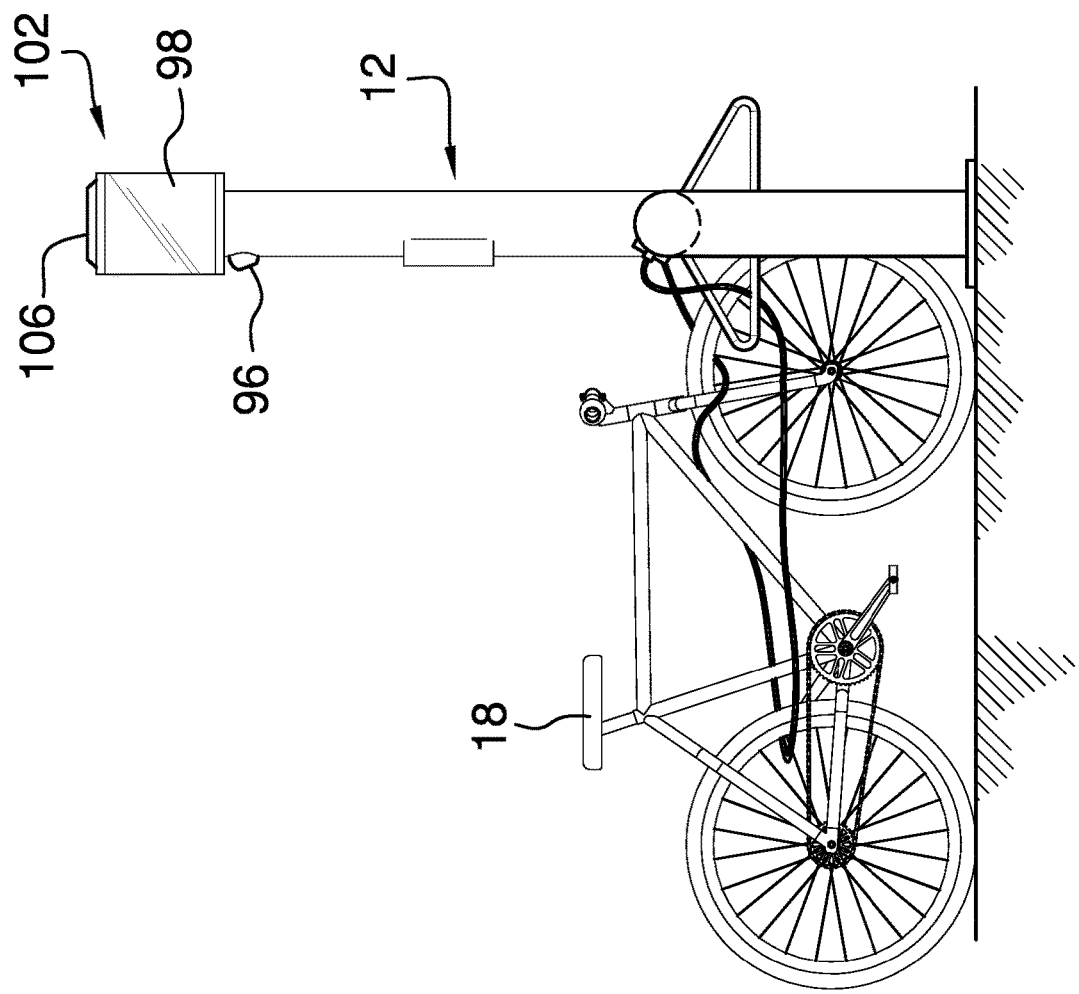
FIG. 2 is a perspective in-use view of an embodiment of the disclosure.
Figure 3:
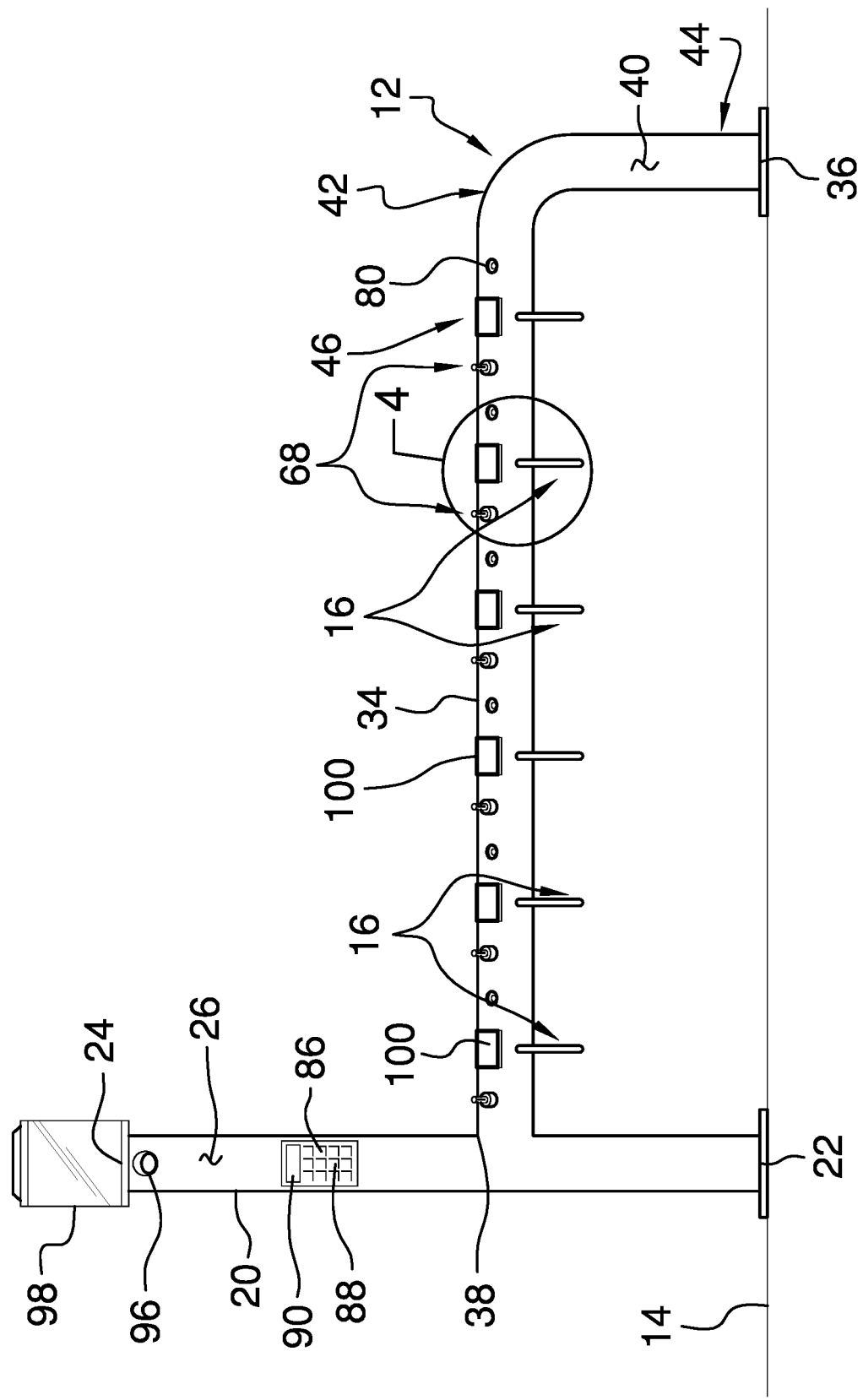
FIG. 3 is a front view of an embodiment of the disclosure.
Figure 4:
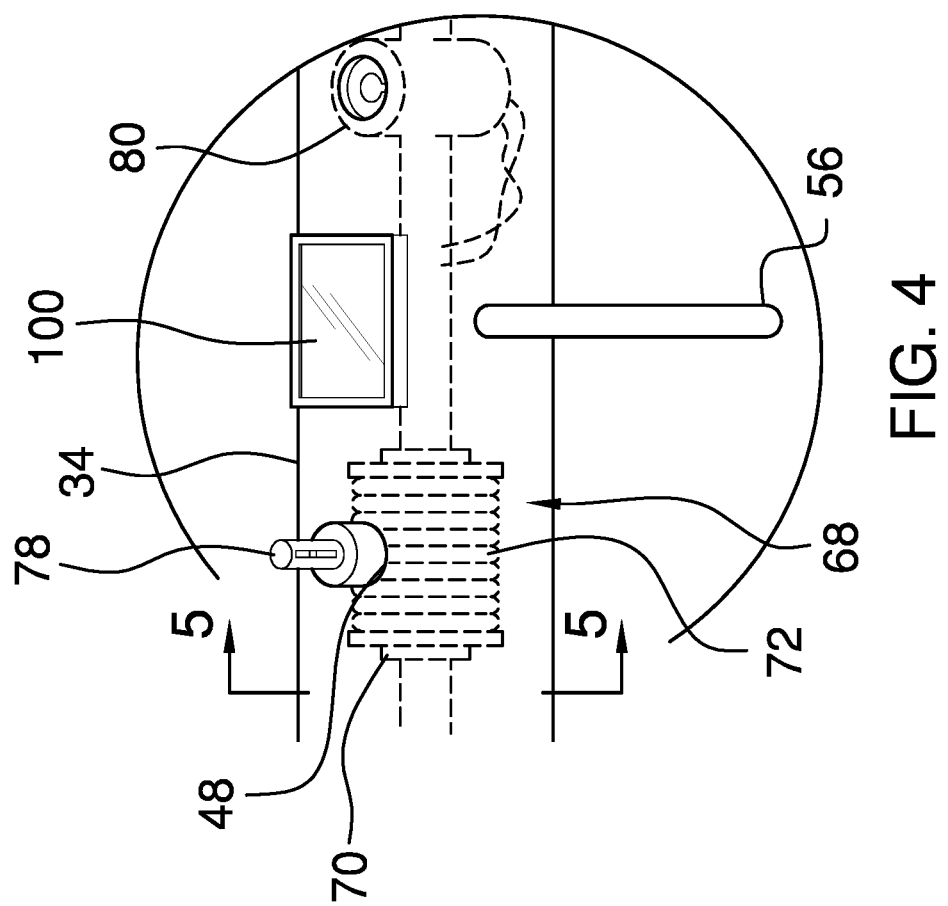
FIG. 4 is a phantom detail view taken from circle 4 of FIG. 3 of an embodiment of the disclosure.
Figure 5:
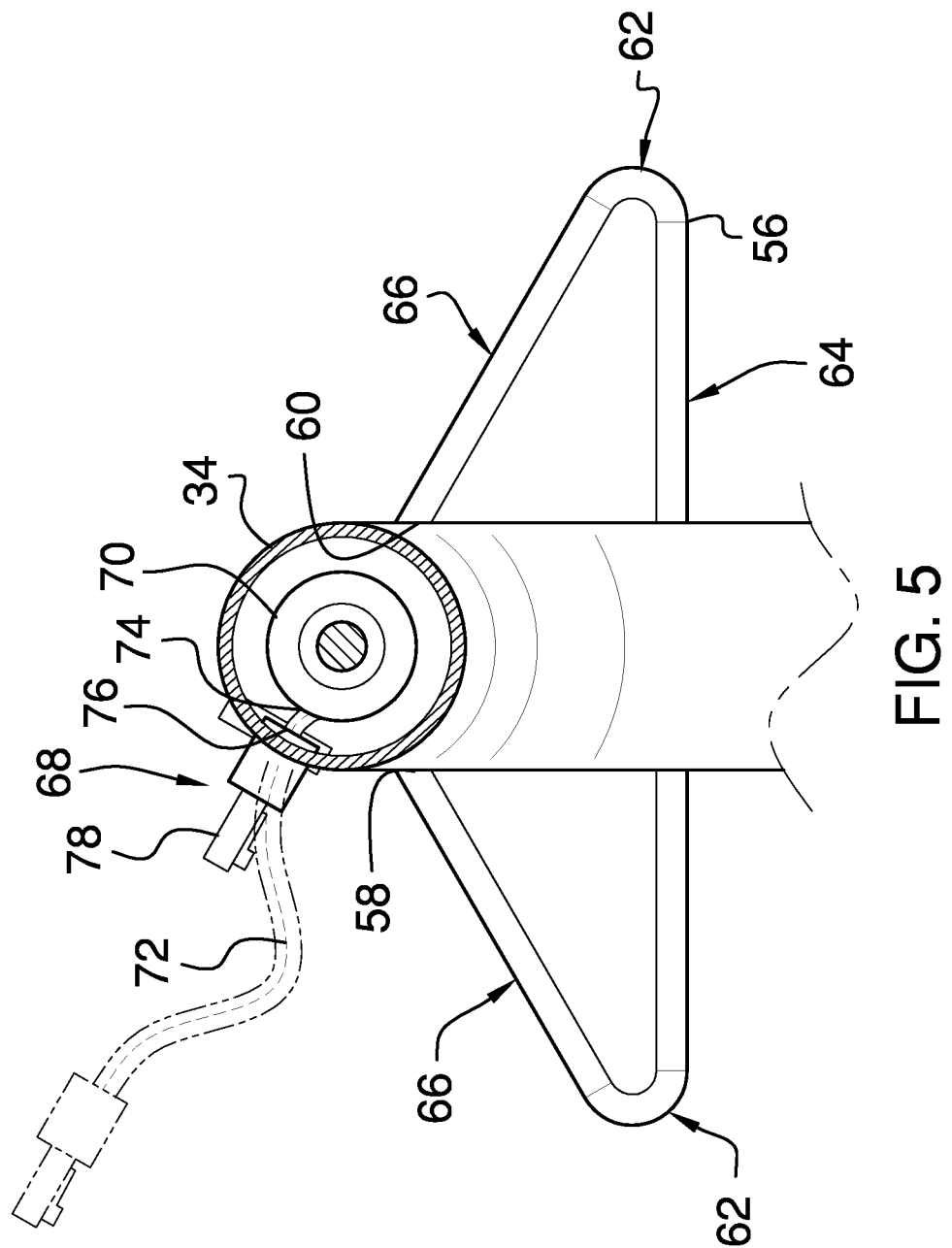
FIG. 5 is a cross sectional view taken from line 5-5 of FIG. 4 of an embodiment of the disclosure.
Figure 6:
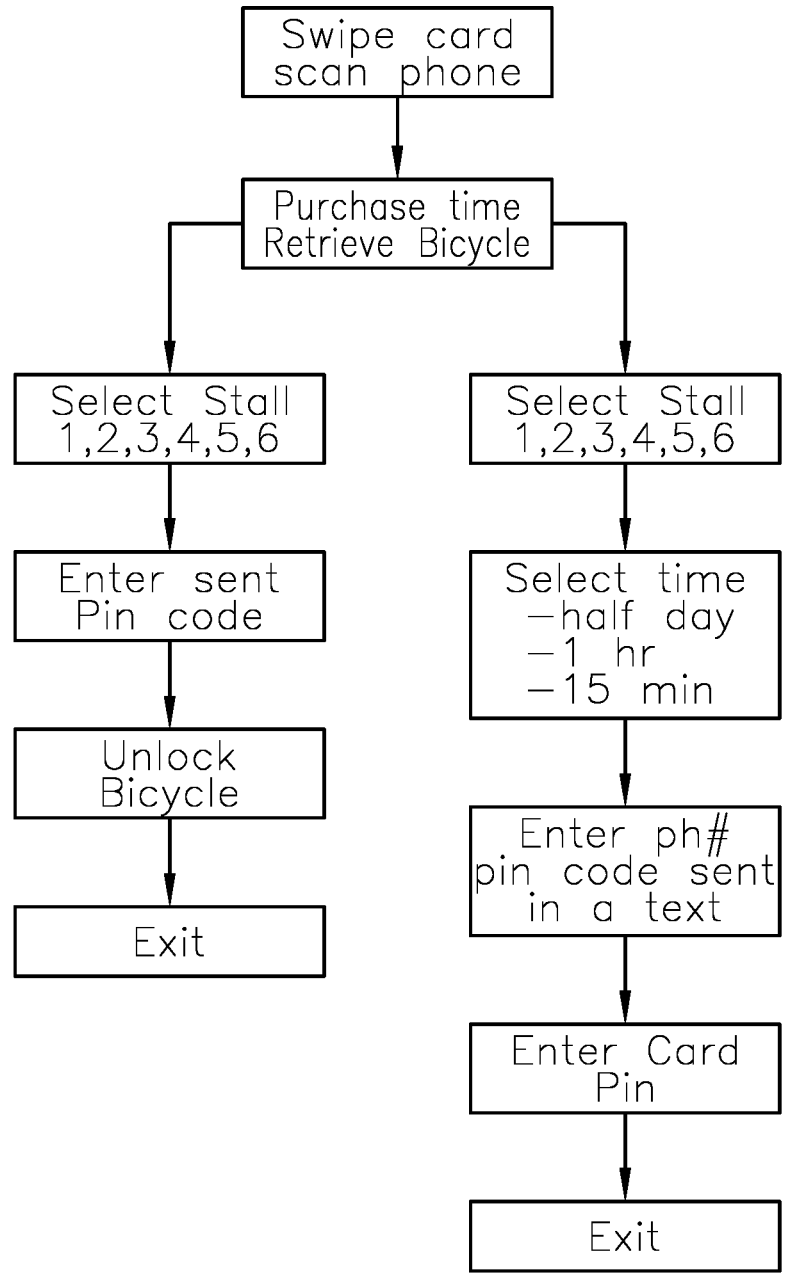
FIG. 6 is a logic tree view of an embodiment of the disclosure.
Figure 7:
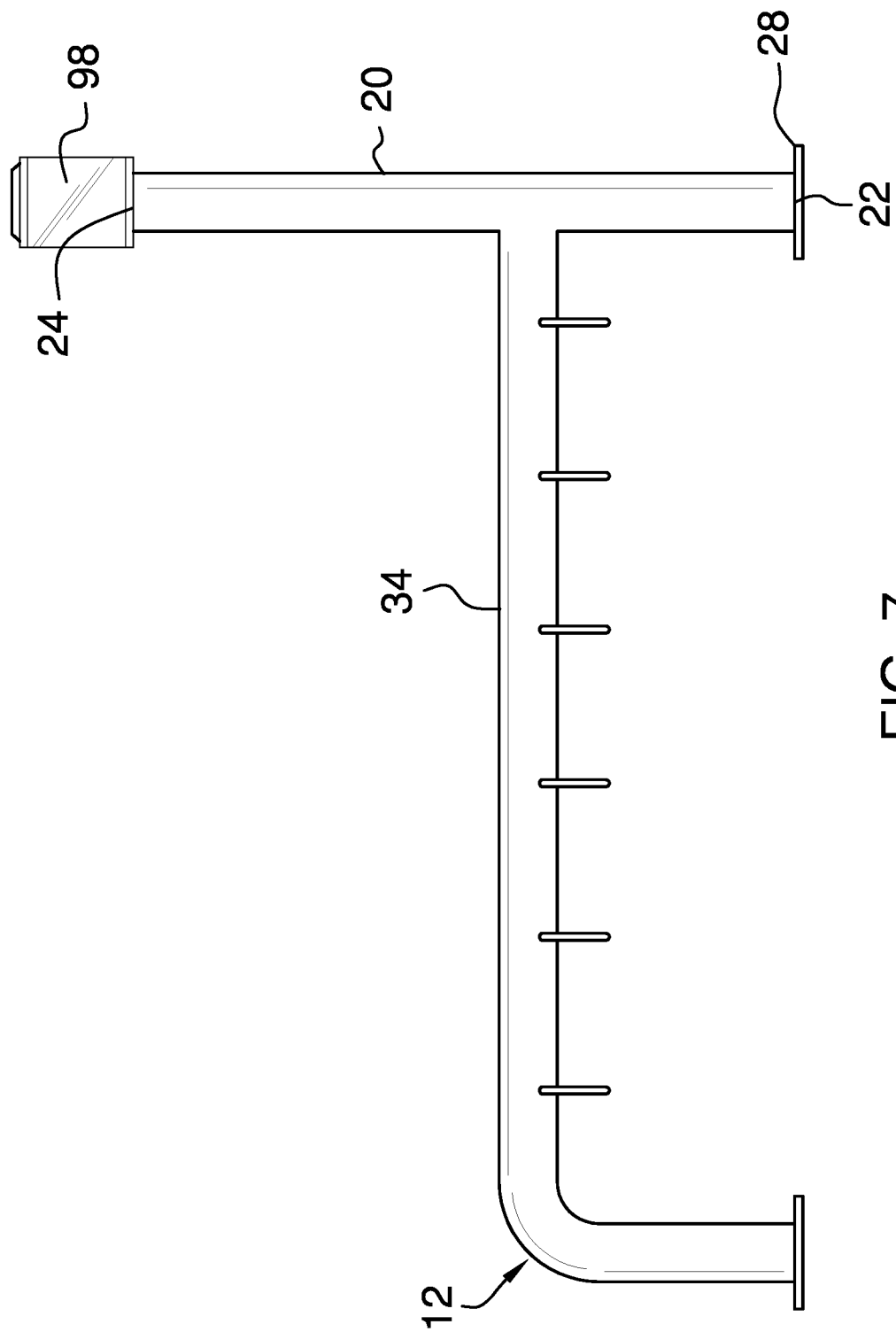
FIG. 7 is a back view of an embodiment of the disclosure.
Figure 8:
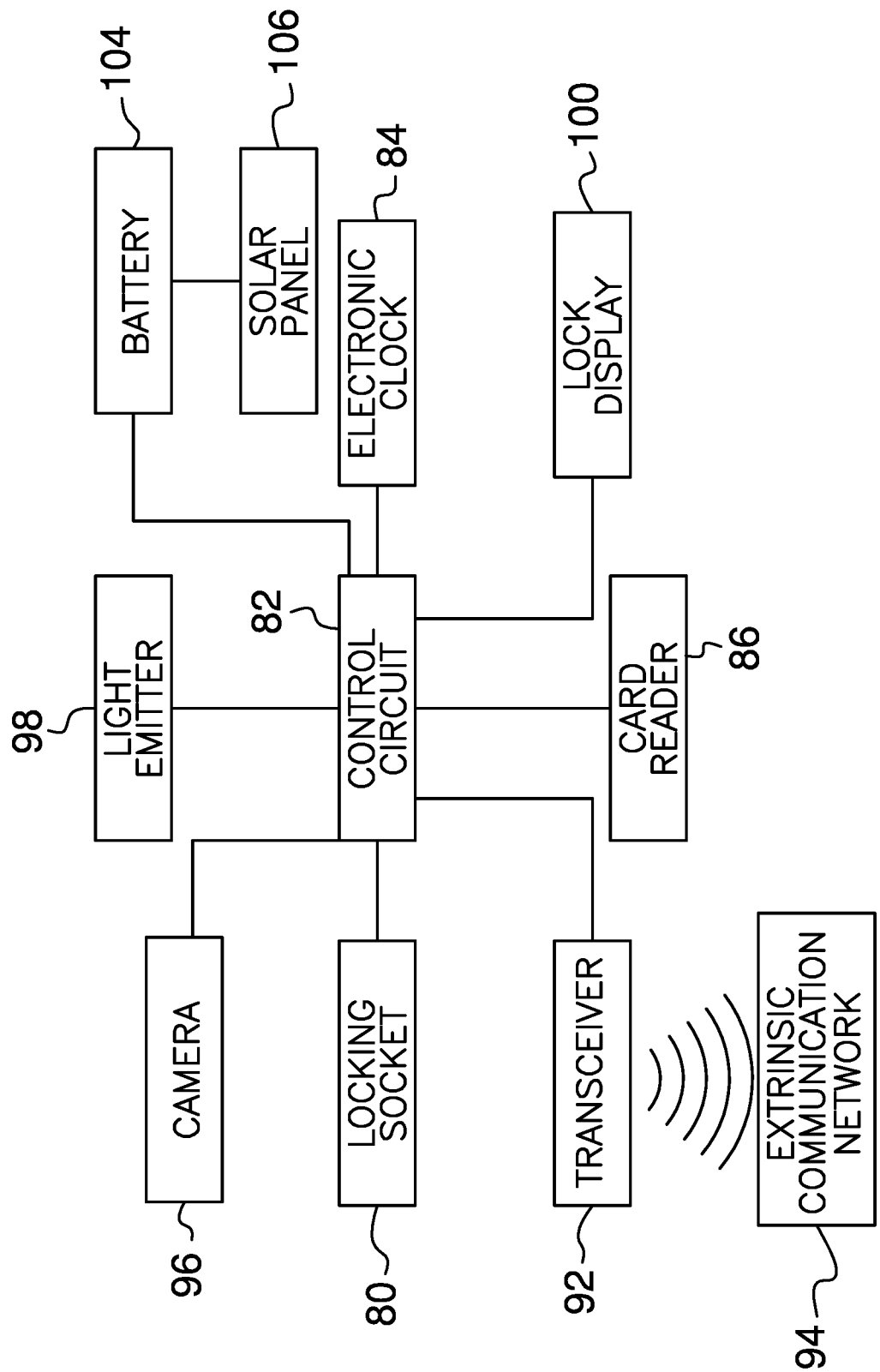
FIG. 8 is a schematic view of an embodiment of the disclosure.

With reference now to the drawings, and in particular to FIGS. 1 through 8 thereof, a new locking device embodying the principles and concepts of an embodiment of the disclosure and generally designated by the reference numeral 10 will be described.

As best illustrated in FIGS. 1 through 8, the bicycle locking assembly 10 generally comprises a bicycle rack 12 that is secured to a support surface 14 thereby facilitating a plurality of bicycles 18 to be parked at the bicycle rack 12. The bicycle rack 12 may be positioned at a public facility, such as a library or a school, thereby facilitating people that ride their bicycles to the public facilitate to lock their bicycles. The bicycle rack 12 has a plurality of parking elements 16 each being integrated into the bicycle rack 12. Each of the plurality of parking elements 16 facilitates a respective one of the bicycles 18 to be parked in the parking elements 16.

The bicycle rack 12 comprises a first member 20 that has a bottom end 22, a top end 24 and an outer surface 26 extending between the top end 24 and the bottom end 22. The bicycle rack 12 includes a first plate 28 that has a top surface 30 and a bottom surface 32, and the bottom end 22 of the first member 20 is coupled to the top surface 30. The bottom surface 32 rests on the support surface 14 having the first member 20 being vertically oriented. A plurality of fasteners, such as bolts or the like, are extended through the first plate 28 and engage the support surface 14 for securing the first plate 28 to the support surface 14.

The bicycle rack 12 includes a second member 34 which has a primary end 36, a secondary end 38 and an exterior surface 40 extending between the primary end 36 and the secondary end 38. The second member 34 has a bend 42 is positioned closer to the primary end 36 than the secondary end 38 to define a first portion 44 of the second member 34 forming an angle with a second portion 46 of the second member 34. The primary end 36 is associated with the first portion 44 and the secondary end 38 is associated with the second portion 46. The secondary end 38 is coupled to the outer surface 26 of the first member 20 having the second portion 46 being horizontally oriented.

The exterior surface 40 of the second member 34 has a plurality of holes 48 each extending into an interior of the second member 34, and the holes 48 are spaced apart from each other and are distributed along the second portion 46. A second plate 50 is provided which has a top surface 52 and a bottom surface 54, and the primary end 36 of the second member 34 is coupled to the top surface 52 of the second plate 50. The bottom surface 54 of the second plate 50 rests on the support surface 14 having the first portion 44 of the second member 34 being vertically oriented. A plurality of fasteners is provided, such as bolts or the like, and each of the fasteners is extended through the second plate 50 and engages the support surface 14 for securing the second plate 50 to the support surface 14.

Each of the parking elements 16 comprises a rod 56 that has a first end 58 and a second end 60, and the rod 56 has a pair of bends 62 integrated into the rod 56 to define a central portion 64 forming an angle with a pair of outward portions 66. Each of the bends 62 is spaced from a respective one of the first end 58 and the second end 60 of the rod 56 and each of the outward portions 66 angle toward each other. Each of the first end 58 and the second end 60 of the rod 56 is coupled to the exterior surface 40 of the second member 34 such that the central portion 64 is horizontally oriented below the second member 34. The parking elements 16 are spaced apart from each other and are distributed along a full length of the first portion 44 of the second member 34.

A plurality of bicycle locks 68 is provided and each of the bicycle locks 68 is movably integrated into the bicycle rack 12. Each of the bicycle locks 68 is positionable in a locking condition having each of the bicycle locks 68 engaging a respective one of the parking elements 16. Each of the bicycle locks 68 is extendable through a respective one of the bicycles 18 thereby locking the respective bicycle 18 to the respective parking element 16. Each of the bicycle locks 68 comprises a spool 70 that is rotatably integrated into the second member 34 of the bicycle rack 12. The spool 70 is biased to rotate in a first direction and the spool 70 is urgeable to rotate in a second direction.

Each of the bicycle locks 68 includes a cable 72 that has a coupled end 74 and a free end 76, and the coupled end 74 is coupled to the spool 70. The cable 72 is wrapped around the spool 70 when the spool 70 rotates in the first direction. Additionally, the cable 72 extends through a respective one of the holes 48 in the second portion 46 of the second member 34 such that the free end 76 is positioned outside of the second member 34. The free end 76 has an engagement 78 which is coupled to the free end 76.

Each of the bicycle locks 68 includes a locking socket 80 that is recessed into the second portion 46 of the second member 34. The locking socket 80 releasably engages the engagement 78 when the engagement 78 is inserted into the locking socket 80. In this way the cable 72 can lock the bicycle to the second member 34. Additionally, the locking socket 80 disengages the engagement 78 when the locking socket 80 receives an unlock command. The locking socket 80 may comprise an electromechanical lock that can engage and disengage the engagement 78.

A control circuit 82 is integrated into the bicycle rack 12 and the control circuit 82 is electrically coupled to the locking socket 80 of each of the bicycle locks 68. The locking socket 80 of each of the bicycle locks 68 is assigned a unique identity in the control circuit 82 and the control circuit 82 receives an unlock input. Moreover, the locking socket 80 of a respective one of the bicycle locks 68 is disengaged when the control circuit 82 receives the unlock input pertaining to the locking socket 80 of the respective bicycle lock 68. The control circuit 82 receives a lock input and the locking socket 80 of a respective one of the bicycle locks 68 is actuated to engage the engagement 78 on the cable 72 of the respective bicycle lock 68 when the control circuit 82 receives the lock input pertaining to the locking socket 80 of the respective bicycle lock 68. Additionally, the control circuit 82 includes an electronic clock 84.

A card reader 86 is coupled to the bicycle rack 12 to read a financial transaction card for processing a payment. The card reader 86 is in communication with each of the bicycle locks 68 and a respective one of the bicycle locks 68 is facilitated to be positioned in the locking condition when the card reader 86 processes a payment. In this way the card reader 86 can facilitate a user to lock their bicycle 18 to the bicycle rack 12. The card reader 86 is electrically coupled to the control circuit 82 and the card reader 86 is positioned on the outer surface 26 of the first member 20 of the bicycle rack 12.

The card reader 86 includes a keypad 88 and the keypad 88 can be manipulated to enter a phone number associated with the user. The card reader 86 includes a reader display 90 that is integrated into the card reader 86. The reader display 90 displays indicia comprising a plurality of pre-determined durations of time. A respective one of the pre-determined durations of time is selected with the keypad 88 to charge a price based upon the pre-determined duration of time that is selected. The reader display 90 may comprise a liquid crystal display or other type of electronic display.

A transceiver 92 is integrated into the bicycle rack 12 and the transceiver 92 is electrically coupled to the control circuit 82. The transceiver 92 broadcasts a numeric code to the user's phone number that is generated by the control circuit 82 when the card reader 86 processes a payment. Furthermore, the control circuit 82 receives the unlock input when the numeric code is entered with the keypad 88. In this way the bicycle lock 68 that is associated with the numeric code facilitates the user to unlock their bicycle 18. The transceiver 92 may comprise a radio frequency transceiver or the like and the transceiver 92 may be in wireless communication with an extrinsic communication network 94. The extrinsic communication network 94 may be the internet, a cellular phone network or other type of wireless communication network that facilitates the transceiver 92 to be in communication with the user's smart phone.

A camera 96 is integrated into the bicycle rack 12 to record footage of the bicycle rack 12 thereby monitoring bicycles 18 that are locked to the bicycle rack 12. The camera 96 is electrically coupled to the control circuit 82 and the camera 96 is positioned on the outer surface 26 of the first member 20. Additionally, the camera 96 is positioned adjacent to the top end 24 of the first member 20 such that the camera 96 is elevated for improving surveillance of the bicycle rack 12. The camera 96 may be a digital video camera or the like and the transceiver 92 may broadcast the footage captured by the camera 96 to a remote data storage unit for subsequent analysis in the event of a theft or vandalism.

A light emitter 98 is coupled to the bicycle rack 12 to emit light outwardly from the bicycle rack 12 for enhancing visibility of the bicycle rack 12 at night. The light emitter 98 is electrically coupled to the control circuit 82 and the light emitter 98 is positioned on the top end 24 of the first member 20. The light emitter 98 may comprise a light emitting diode or other type of electronic light emitter and a lens that surrounds the light emitter 98.

A plurality of lock displays 100 is each coupled to the exterior surface 40 of the second member 34. Each of the lock displays 100 is aligned with a respective one of the bicycle locks 68 and each of the lock displays 100 is electrically coupled to the control circuit 82. Additionally, each of the lock displays 100 can display indicia comprising numbers representing the remaining duration of time that the respective bicycle lock 68 will be locked. Each of the lock displays 100 may comprise a liquid crystal display or other type of electronic display.

A power supply 102 is integrated into the bicycle rack 12 and the power supply 102 is electrically coupled to the control circuit 82. The power supply 102 comprises at least one battery 104 is positioned in the bicycle rack 12 and the at least one battery 104 is electrically coupled to the control circuit 82. The power supply 102 includes a solar panel 106 that is disposed on the first member 20 such that the solar panel 106 is exposed to sunlight. Furthermore, the solar panel 106 is electrically coupled to the at least one battery 104 for charging the at least one battery 104.

In use, the user parks their bicycle 18 in a selected parking element and the user swipes their financial transaction card in the card reader 86. The user selects a duration of time on the keypad 88 and the reader display 90 and the user then enters their phone number with the keypad 88. The numeric code is broadcast to the user's phone and the user routes the cable 72 associated with the selected parking element 16 through their bicycle 18 and inserts the free end 76 of the cable 72 into the locking socket 80 associated with the selected parking element 16. In this way the user's bicycle 18 is locked in the selected parking element 16. The user enters the numeric code into the keypad 88 when the user wishes to retrieve their bicycle 18 to facilitate the free end 76 of the cable 72 to be removed from the locking socket 80. In this way the user can remove their bicycle 18 from the selected parking element 16 to ride the bicycle.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bicycle locking assembly for locking multiple bicycles in a public location, said assembly comprising:
    a bicycle rack being secured to a support surface wherein said bicycle rack is configured to have a plurality of bicycles parked at said bicycle rack, said bicycle rack having a plurality of parking elements each being integrated into said bicycle rack wherein said each of said plurality of parking elements is configured to have a respective one of the bicycles parked in said parking elements;
    a plurality of bicycle locks, each of said bicycle locks being movably integrated into said bicycle rack, each of said bicycle locks being positionable in a locking condition having each of said bicycle locks engaging a respective one of said parking elements, each of said bicycle locks being extendable through a respective one of the bicycles thereby locking the respective bicycle to said respective parking element;
    a card reader being coupled to said bicycle rack wherein said card reader is configured to read a financial transaction card for processing a payment, said card reader being in communication with each of said bicycle locks, a respective one of said bicycle locks being facilitated to be positioned in said locking condition when said card reader processes a payment wherein said card reader is configured to facilitate a user to lock their bicycle to said bicycle rack;
    a camera being integrated into said bicycle rack wherein said camera is configured to record footage of said bicycle rack thereby monitoring bicycles that are locked to said bicycle rack;
    a light emitter being coupled to said bicycle rack wherein said light emitter is configured to emit light outwardly from said bicycle rack for enhancing visibility of said bicycle rack at night;
    wherein said bicycle rack comprises:
        a first member having a bottom end, a top end and an outer surface extending between said top end and said bottom end;
        a first plate having a top surface and a bottom surface, said bottom end of said first member being coupled to said top surface, said bottom surface being configured to rest on the support surface having said first member being vertically oriented;
        a second member having a primary end, a secondary end and an exterior surface extending between said primary end and said secondary end, said second member having a bend being positioned closer to said primary end than said secondary end to define a first portion of said second member forming an angle with a second portion of said second member, said primary end being associated with said first portion, said secondary end being associated with said second portion, said secondary end being coupled to said outer surface of said first member having said second portion being horizontally oriented, said exterior surface of said second member having a plurality of holes each extending into an interior of said second member, said holes being spaced apart from each other and being distributed along said second portion; and
        a second plate having a top surface and a bottom surface, said primary end of said second member being coupled to said top surface of said second plate, said bottom surface of said second plate being configured to rest on the support surface having said first portion of said second member being vertically oriented.

2. The assembly according to claim 1, wherein each of said parking elements comprises a rod having a first end and a second end, said rod having a pair of bends being integrated into said rod to define a central portion forming an angle with a pair of outward portions, each of said bends being spaced from a respective one of said first end and said second end of said rod, each of said outward portions angling toward each other, each of said first end and said second end of said rod being coupled to said exterior surface of said second member such that said central portion is horizontally oriented below said second member, said parking elements being spaced apart from each other and being distributed along a full length of said first portion of said second member.

3. The assembly according to claim 1, wherein each of said bicycle locks comprises:
a spool being rotatably integrated into said second member of said bicycle rack, said spool being biased to rotate in a first direction, said spool being urgeable to rotate in a second direction; and
a cable having a coupled end and a free end, said coupled end being coupled to said spool, said cable being wrapped around said spool when said spool rotates in said first direction, said cable extending through a respective one of said holes in said second portion of said second member such that said free end is positioned outside of said second member, said free end having an engagement being coupled to said free end.

4. The assembly according to claim 3, wherein each of said bicycle locks includes a locking socket being recessed into said second portion of said second member, said locking socket releasably engaging said engagement when said engagement is inserted into said locking socket thereby facilitating said cable to lock the bicycle to said second member, said locking socket disengaging said engagement when said locking socket receives an unlock command.

5. The assembly according to claim 2, further comprising a control circuit being integrated into said bicycle rack, said control circuit being electrically coupled to said locking socket of each of said bicycle locks, said locking socket of each of said bicycle locks being assigned a unique identity in said control circuit, said control circuit receiving an unlock input, said locking socket of a respective one of said bicycle locks being disengaged when said control circuit receives said unlock input pertaining to said locking socket of said respective bicycle lock.

6. The assembly according to claim 5, wherein said control circuit receives a lock input, said locking socket of a respective one of said bicycle locks being actuated to engage said engagement on said cable of said respective bicycle lock when said control circuit receives said lock input pertaining to said locking socket of said respective bicycle lock, said control circuit including an electronic clock.

7. The assembly according to claim 5, wherein said card reader is electrically coupled to said control circuit, said card reader being positioned on said outside surface of said first member of said bicycle rack, said card reader including a keypad wherein said keypad is configured to be manipulated to enter a phone number associated with the user.

8. The assembly according to claim 7, wherein said card reader includes a reader display being integrated into said card reader, said reader display displaying indicia comprising a plurality of pre-determined durations of time, a respective one of said pre-determined durations of time being selected with said keypad wherein said card reader is configured to charge a price based upon said pre-determined duration of time that is selected.

9. The assembly according to claim 5, further comprising a transceiver being integrated into said bicycle rack, said transceiver being electrically coupled to said control circuit, said transceiver being configured to broadcast a numeric code to the user's phone number being generated by said control circuit when said card reader processes a payment, said control circuit receiving said unlock input when said numeric code is entered with said keypad wherein said bicycle lock that is associated with said numeric code is configured to facilitate the user to unlock their bicycle.

10. The assembly according to claim 5, wherein said camera is electrically coupled to said control circuit, said camera being positioned on said outer surface of said first member, said camera being positioned adjacent to said top end of said first member wherein said camera is configured to be elevated for improving surveillance of said bicycle rack.

11. The assembly according to claim 5, further comprising a plurality of lock displays, each of said lock displays being coupled to said exterior surface of said second member, each of said lock displays being aligned with a respective one of said bicycle locks, each of said lock displays being electrically coupled to said control circuit, each of said lock displays displaying indicia comprising numbers representing a remaining duration of time that said respective bicycle lock will be locked.

12. The assembly according to claim 5, further comprising a power supply being integrated into said bicycle rack, said power supply being electrically coupled to said control circuit, said power supply comprising:
at least one battery being positioned in said bicycle rack, said at least one battery being electrically coupled to said control circuit; and
a solar panel being disposed on said first member wherein said solar panel is configured to be exposed to sunlight, said solar panel being electrically coupled to said at least one battery for charging said at least one battery.

13. A bicycle locking assembly for locking multiple bicycles in a public location, said assembly comprising:
a bicycle rack being secured to a support surface wherein said bicycle rack is configured to have a plurality of bicycles parked at said bicycle rack, said bicycle rack having a plurality of parking elements each being integrated into said bicycle rack wherein said each of said plurality of parking elements is configured to have a respective one of the bicycles parked in said parking elements, said bicycle rack comprising:
a first member having a bottom end, a top end and an outer surface extending between said top end and said bottom end;
a first plate having a top surface and a bottom surface, said bottom end of said first member being coupled to said top surface, said bottom surface being configured to rest on the support surface having said first member being vertically oriented;
a second member having a primary end, a secondary end and an exterior surface extending between said primary end and said secondary end, said second member having a bend being positioned closer to said primary end than said secondary end to define a first portion of said second member forming an angle with a second portion of said second member, said primary end being associated with said first portion, said secondary end being associated with said second portion, said secondary end being coupled to said outer surface of said first member having said second portion being horizontally oriented, said exterior surface of said second member having a plurality of holes each extending into an interior of said second member, said holes being spaced apart from each other and being distributed along said second portion;
a second plate having a top surface and a bottom surface, said primary end of said second member being coupled to said top surface of said second plate, said bottom surface of said second plate being configured to rest on the support surface having said first portion of said second member being vertically oriented; and wherein each of said parking elements comprises a rod having a first end and a second end, said rod having a pair of bends being integrated into said rod to define a central portion forming an angle with a pair of outward portions, each of said bends being spaced from a respective one of said first end and said second end of said rod, each of said outward portions angling toward each other, each of said first end and said second end of said rod being coupled to said exterior surface of said second member such that said central portion is horizontally oriented below said second member, said parking elements being spaced apart from each other and being distributed along a full length of said first portion of said second member;

a plurality of bicycle locks, each of said bicycle locks being movably integrated into said bicycle rack, each of said bicycle locks being positionable in a locking condition having each of said bicycle locks engaging a respective one of said parking elements, each of said bicycle locks being extendable through a respective one of the bicycles thereby locking the respective bicycle to said respective parking element, each of said bicycle locks comprising:

a spool being rotatably integrated into said second member of said bicycle rack, said spool being biased to rotate in a first direction, said spool being urgeable to rotate in a second direction;

a cable having a coupled end and a free end, said coupled end being coupled to said spool, said cable being wrapped around said spool when said spool rotates in said first direction, said cable extending through a respective one of said holes in said second portion of said second member such that said free end is positioned outside of said second member, said free end having an engagement being coupled to said free end; and a locking socket being recessed into said second portion of said second member, said locking socket releasably engaging said engagement when said engagement is inserted into said locking socket thereby facilitating said cable to lock the bicycle to said second member, said locking socket disengaging said engagement when said locking socket receives an unlock command;

a control circuit being integrated into said bicycle rack, said control circuit being electrically coupled to said locking socket of each of said bicycle locks, said locking socket of each of said bicycle locks being assigned a unique identity in said control circuit, said control circuit receiving an unlock input, said locking socket of a respective one of said bicycle locks being disengaged when said control circuit receives said unlock input pertaining to said locking socket of said respective bicycle lock, said control circuit receiving a lock input, said locking socket of a respective one of said bicycle locks being actuated to engage said engagement on said cable of said respective bicycle lock when said control circuit receives said lock input pertaining to said locking socket of said respective bicycle lock, said control circuit including an electronic clock;

a card reader being coupled to said bicycle rack wherein said card reader is configured to read a financial transaction card for processing a payment, said card reader being in communication with each of said bicycle locks, a respective one of said bicycle locks being facilitated to be positioned in said locking condition when said card reader processes a payment wherein said card reader is configured to facilitate a user to lock their bicycle to said bicycle rack, said card reader being electrically coupled to said control circuit, said card reader being positioned on said outside surface of said first member of said bicycle rack, said card reader including a keypad wherein said keypad is configured to be manipulated to enter a phone number associated with the user, said card reader including a reader display being integrated into said card reader, said reader display displaying indicia comprising a plurality of pre-determined durations of time, a respective one of said pre-determined durations of time being selected with said keypad wherein said card reader is configured to charge a price based upon said pre-determined duration of time that is selected;

a transceiver being integrated into said bicycle rack, said transceiver being electrically coupled to said control circuit, said transceiver being configured to broadcast a numeric code to the user's phone number being generated by said control circuit when said card reader processes a payment, said control circuit receiving said unlock input when said numeric code is entered with said keypad wherein said bicycle lock that is associated with said numeric code is configured to facilitate the user to unlock their bicycle;

a camera being integrated into said bicycle rack wherein said camera is configured to record footage of said bicycle rack thereby monitoring bicycles that are locked to said bicycle rack, said camera being electrically coupled to said control circuit, said camera being positioned on said outer surface of said first member, said camera being positioned adjacent to said top end of said first member wherein said camera is configured to be elevated for improving surveillance of said bicycle rack;

a light emitter being coupled to said bicycle rack wherein said light emitter is configured to emit light outwardly from said bicycle rack for enhancing visibility of said bicycle rack at night, said light emitter being electrically coupled to said control circuit, said light emitter being positioned on said top end of said first member;

a plurality of lock displays, each of said lock displays being coupled to said exterior surface of said second member, each of said lock displays being aligned with a respective one of said bicycle locks, each of said lock displays being electrically coupled to said control circuit, each of said lock displays displaying indicia comprising numbers representing the remaining duration of time that said respective bicycle lock will be locked; and a power supply being integrated into said bicycle rack, said power supply being electrically coupled to said control circuit, said power supply comprising:

at least one battery being positioned in said bicycle rack, said at least one battery being electrically coupled to said control circuit; and a solar panel being disposed on said first member wherein said solar panel is configured to be exposed to sunlight, said solar panel being electrically coupled to said at least one battery for charging said at least one battery.

\* \* \* \* \*